USO11275678B2

(12) United States Patent
Park

(10) Patent No.: US 11,275,678 B2
(45) Date of Patent: Mar. 15, 2022

(54) DATA STORAGE DEVICE WITH SPARE BLOCKS FOR REPLACING BAD BLOCK IN SUPER BLOCK AND OPERATING METHOD THEREOF

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/588,316

(22) Filed: Sep. 30, 2019

(65) Prior Publication Data

US 2020/0133838 A1 Apr. 30, 2020

(30) Foreign Application Priority Data

Oct. 31, 2018 (KR) .......................... 10-2018-0131695

(51) Int. Cl.
G06F 12/02 (2006.01)
G06F 12/06 (2006.01)
G06F 3/06 (2006.01)
G06F 13/16 (2006.01)
G06F 11/07 (2006.01)
G06F 11/16 (2006.01)

(52) U.S. Cl.
CPC .......... G06F 12/0246 (2013.01); G06F 3/064 (2013.01); G06F 11/073 (2013.01); G06F 11/1658 (2013.01); G06F 12/0607 (2013.01); G06F 13/1668 (2013.01)

(58) Field of Classification Search
CPC ......... G06F 12/0246; G06F 2212/7204; G06F 2212/7205; G06F 3/064; G06F 3/0688; G06F 3/0607
See application file for complete search history.

(56) References Cited

U.S. PATENT DOCUMENTS 9,766,814 B2 9/2017 Guo et al.
2009/0292944 A1* 11/2009 Gonzalez ............. G11C 29/808
714/5.1
2016/0034341 A1* 2/2016 Ojalvo .................. G06F 3/0619
714/770

(Continued)

FOREIGN PATENT DOCUMENTS

KR 1020150133913 12/2015
KR 1020180047329 5/2018

*Primary Examiner* — Tracy A Warren
(74) *Attorney, Agent, or Firm* — IP & T Group LLP

(57) ABSTRACT

A data storage device includes a memory device and a controller. The memory device includes a plurality of planes, wherein each of the planes includes two or more memory blocks. The controller is configured to control an operation of the memory device. The controller is further configured to generate a first super block as a super block including two or more way-interleavable memory blocks among the plurality of memory blocks of the plurality of planes, determine whether each of the memory blocks included in the first super block is a bad block, retrieve a spare block for replacing a first memory block determined as a bad block, in the plurality of planes; and generate a second replacing super block as a super block in which the first memory block is replaced with a second memory block positioned in a plane which does not have the first memory block, when all spare blocks of a plane including the first memory block are used.

18 Claims, 8 Drawing Sheets

(56) References Cited

U.S. PATENT DOCUMENTS

2016/0077749 A1\* 3/2016 Ravimohan ........... G06F 3/0688
  711/103
2018/0276116 A1\* 9/2018 Hahn .................... G06F 3/0659

\* cited by examiner

DATA STORAGE DEVICE WITH SPARE BLOCKS FOR REPLACING BAD BLOCK IN SUPER BLOCK AND OPERATING METHOD THEREOF

CROSS-REFERENCES TO RELATED APPLICATION

The present application claims priority under 35 U.S.C. § 119(a) to Korean application number 10-2018-0131695, filed on Oct. 31, 2018, which is incorporated herein by reference in its entirety.

BACKGROUND

1. Technical Field

Various embodiments generally relate to a semiconductor device, and more particularly, to a data storage device and an operating method thereof.

2. Related Art

Recently, the paradigm for the computing environment has changed to the ubiquitous computing environment in which computer systems can be used anytime, anywhere. Therefore, the use of portable electronic devices such as a mobile phone, digital camera and notebook computer has rapidly increased. Such portable electronic devices generally use a data storage device using a memory device. The data storage device is used to store data used in the portable electronic device.

Since the data storage device using a memory device has no mechanical driver, the data storage device has excellent stability and durability, exhibits high information access speed, and has low power consumption. Examples of the data storage device having such advantages include a universal serial bus (USB) memory device, a memory card having various interfaces, a universal flash storage (UFS) device, and a solid state drive (SSD).

SUMMARY

Various embodiments are directed to a technique for replacing a non-way-interleavable memory block with a way-interleavable memory block.

In an embodiment, a data storage device may include a memory device including a plurality of planes, wherein each of the planes includes two or more memory blocks; and a controller configured to control an operation of the memory device. The controller is further configured to generate a first super block as a super block including two or more way-interleavable memory blocks among the plurality of memory blocks of the plurality of planes, determine whether each of the memory blocks included in the first super block is a bad block; retrieve a spare block for replacing a first memory block determined as a bad block, in the plurality of planes; and generate a second replacing super block as a super block in which the first memory block is replaced with a second memory block positioned in a plane which does not have the first memory block, when all spare blocks of a plane including the first memory block are used.

In an embodiment, there is provided an operating method of a data storage device which includes a memory device including a plurality of memory blocks and a controller configured to control an operation of the memory device. The operating method may include the steps of: generating a first super block as a super block including two or more way-interleavable memory blocks among the plurality of memory blocks; determining whether each of the memory blocks included in the first super block is a bad block; retrieving a spare block for replacing a first memory block determined as a bad block, in the plurality of planes; generating a second replacing super block as a super block in which the first memory block is replaced with a second memory block positioned in a plane which does not have the first memory block, when all spare blocks of a plane including the first memory block are used; retrieving a third memory block which has become available as a way-interleavable spare block for replacing the second memory block after the second replacing super block was generated; and generating a third replacing super block as a super block in which the second memory block is replaced with the third memory block.

In an embodiment, a data storage device may include a memory device including a plurality of planes, wherein each of the planes includes two or more memory blocks; and a controller configured to control an operation of the memory device. The controller is configured to manage super blocks, each including two or more way-interleavable memory blocks among the plurality of memory blocks; determine whether a memory block included in each of the super blocks is bad block; and manage one or more spare super blocks, each having two or more way-interleavable memory spare blocks to be replaced with the bad block based on a bad block determination, wherein, when the bad block is replaced with a non-way-interleavable memory spare block in a spare super block, the bad block is re-replaced with a way-interleavable memory spare block in another spare super block.

In an embodiment, there is a method of operating a data storage device which includes a memory device including a plurality of planes, each having two or more memory blocks and a controller configured to control an operation of the memory device. The operating method comprising managing super blocks, by the controller, each including two or more way-interleavable memory blocks among the plurality of memory blocks; determining whether a memory block included in each of the super blocks is bad block, by the controller; manage one or more spare super blocks, by the controller, each having two or more way-interleavable memory spare blocks to be replaced with the bad block based on a bad block determination; and when the bad block is replaced with a non-way-interleavable memory spare block in a spare super block as a non-way interleavable memory block, generating a new super block by replacing the non-way-interleavable memory block with a way-interleavable memory spare block in another spare super block.

In an embodiment, a data storage device may include a memory device including a plurality of planes, wherein each of the planes includes two or more memory blocks; and a controller configured to control an operation of the memory device. The controller includes a super block manager configured to manage super blocks, each including two or more way-interleavable memory blocks among the plurality of memory blocks; a bad block determinator configured to determine whether a memory block included in each of the super blocks is bad block; a spare block manager configured to manage one or more spare super blocks, each having two or more way-interleavable memory spare blocks to replace the bad block based on a bad block determination; and wherein when the bad block is replaced with a non-way-interleavable memory spare block in a spare super block as a non-way interleavable memory block, the super block manager is configured to generate a new super block by replacing the non-way-interleavable memory block with a way-interleavable memory spare block in another spare super block.

DETAILED DESCRIPTION

Hereinafter, a data storage device and an operating method thereof according to the present disclosure will be described below with reference to the accompanying drawings through exemplary embodiments.

Figure 1:
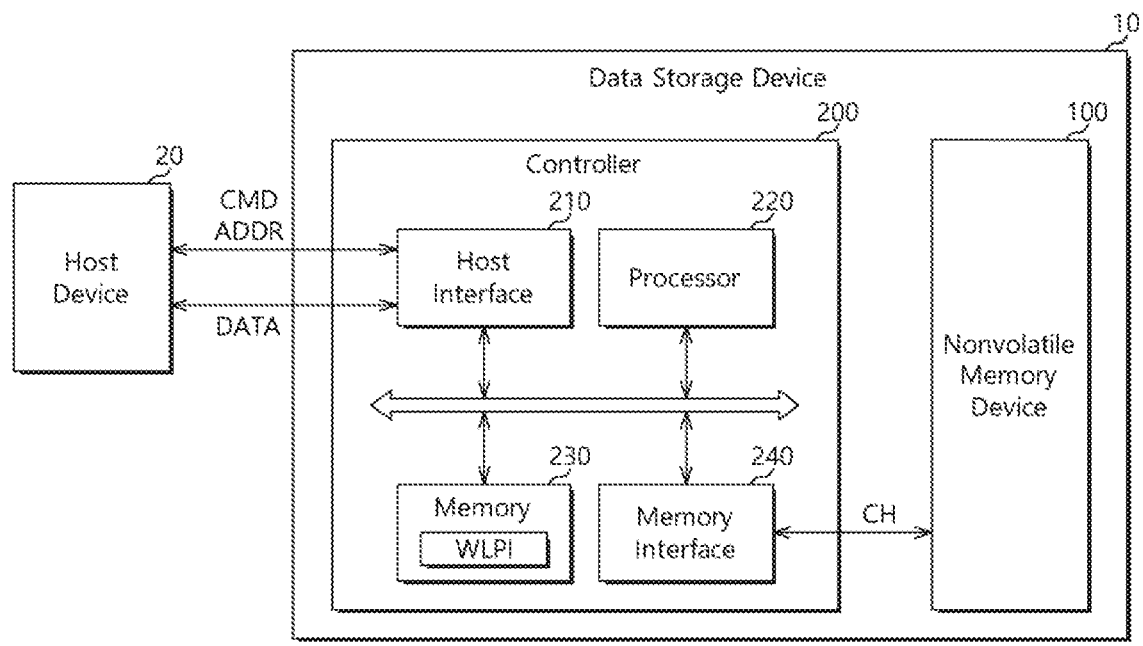
FIG. 1 is a diagram illustrating a configuration of a data storage device in accordance with an embodiment.

FIG. 1 is a diagram illustrating a configuration of a data storage device 10 in accordance with an embodiment.

Referring to FIG. 1, the data storage device 10 in accordance with the present embodiment may store data accessed by a host device 20 such as a mobile phone, MP3 player, laptop computer, desktop computer, game machine, TV or in-vehicle infotainment system. The data storage device 10 may be referred to as a memory system.

The data storage device 10 may be fabricated as any one of various types of storage devices depending on an interface protocol coupled to the host device 20. For example, the data storage device 10 may be configured as any one of various types of storage devices which include a solid state drive (SSD), a multimedia card (MMC) such as an eMMC, RS-MMC or micro-MMC, a secure digital (SD) card such as a mini-SD or micro-SD card, a universal serial bus (USB) storage device, a universal flash storage (UFS) device, a personal computer memory card international association (PCMCIA) card-type storage device, a peripheral component interconnection (PCI) card-type storage device, a PCI express (PCI-E) card-type storage device, a compact flash (CF) card, a smart media card and a memory stick.

The data storage device 10 may be fabricated as any one of various types of packages. For example, the data storage device 10 may be fabricated as any one of various types of packages such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 10 may include a nonvolatile memory device 100 and a controller 200.

The nonvolatile memory device 100 may operate as a storage medium of the data storage device 10. The nonvolatile memory device 100 may be configured as any one of various types of nonvolatile memory devices including a NAND flash memory device, a NOR flash memory device, a ferroelectric random access memory (FRAM) using a ferroelectric capacitor, a magnetic RAM (MRAM) using a tunneling magneto-resistive (TMR) film, a phase change RAM (PRAM) using chalcogenide alloys, and a resistive RAM (ReRAM) using transition metal oxide, depending on memory cells.

FIG. 1 illustrates that the data storage device 10 includes one nonvolatile memory device 100. However, this is only for convenience of description, and the data storage device 10 may include a plurality of nonvolatile memory devices. The present embodiment may be applied in the same manner to the data storage device 10 including a plurality of nonvolatile memory devices.

The nonvolatile memory device 100 may include a memory cell array (not illustrated) having a plurality of memory cells arranged at the respective intersections between a plurality of bit lines (not illustrated) and a plurality of word lines (not illustrated). The memory cell array may include a plurality of memory blocks, and each of the memory blocks may include a plurality of pages.

For example, each of the memory cells of the memory cell array may be configured as a single level cell (SLC) capable of storing 1-bit data or a multi-level cell (MLC) capable of storing 2 or more-bit data. The MLC may store 2-bit data, 3-bit data, 4-bit data or the like. In general, a memory cell for storing 2-bit data may be referred to as an MLC, a memory cell for storing 3-bit data may be referred to as a triple level cell (TLC), and a memory cell for storing 4-bit data may be referred to as a quadruple level cell (QLC). In the present embodiment, however, the memory cells for storing 2-bit to 4-bit data will be collectively referred to as MLCs, for convenience of description.

The memory cell array 110 may include one or more of the SLC and the MLC. Furthermore, the memory cell array 110 may include memory cells with a two-dimensional horizontal structure or memory cells with a three-dimensional vertical structure.

The controller 200 may control overall operations of the data storage device 10 by driving firmware or software loaded to the memory 230. The controller 200 may decode and drive a code-based instruction or algorithm such as firmware or software. The controller 200 may be implemented in hardware or a combination of hardware and software.

The controller 200 may include a host interface 210, a processor 220, a memory 230 and a memory interface 240. Although not illustrated in FIG. 1, the controller 200 may further include an error correction code (ECC) engine which generates parity data by performing ECC encoding on write data provided from a host device, and performs ECC decoding on read data read from the nonvolatile memory device 100 using the parity data.

The host interface 210 may interface the host device 20 and the data storage device 10 according to a protocol of the host device 20. For example, the host interface 210 may communicate with the host device 20 through any one protocol of USB (universal serial bus), UFS (universal flash storage), MMC (multimedia card), PATA (parallel advanced technology attachment), SATA (serial advanced technology attachment), SCSI (small computer system interface), SAS (serial attached SCSI), PCI (peripheral component interconnection) and PCI-E (PCI express).

The processor 220 may include a micro control unit (MCU) and a central processing unit (CPU). The processor 220 may process a request transferred from the host device 20. In order to process the request transferred from the host device 20, the processor 220 may drive a code-based instruction or algorithm loaded to the memory 230, i.e. firmware, and control the nonvolatile memory device 100 and internal function blocks such as the host interface 210, the memory 230 and the memory interface 240.

The processor 220 may generate control signals to control an operation of the nonvolatile memory device 100 based on requests transferred from the host device 20, and provide the generated control signals to the nonvolatile memory device 100 through the memory interface 240.

The memory 230 may be configured as a random access memory (RAM) such as a dynamic RAM (DRAM) or static RAM (SRAM). The memory 230 may store the firmware driven by the processor 220. Furthermore, the memory 230 may store data required for driving the firmware, for example, metadata. That is, the memory 230 may operate as a working memory of the processor 220.

The memory 230 may include a data buffer for temporarily storing write data which are to be transferred from the host device 20 to the nonvolatile memory device 100 or read data which are to be transferred from the nonvolatile memory device 100 to the host device 20. That is, the memory 230 may operate as a buffer memory.

The memory interface 240 may control the nonvolatile memory device 100 under control of the processor 220. The memory interface 240 may also be referred to as a memory controller. The memory interface 240 may provide control signals to the nonvolatile memory device 100. The control signals may include a command, address and operation control signal for controlling the nonvolatile memory device 100. The memory interface 240 may provide data stored in the data buffer to the nonvolatile memory device 100 or store data transferred from the nonvolatile memory device 100 in the data buffer.

Figure 2:
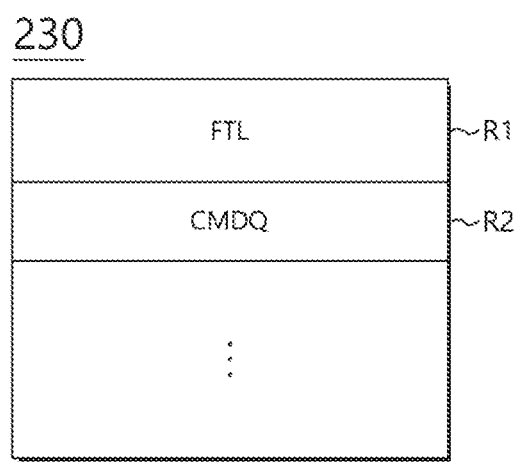
FIG. 2 is a diagram illustrating a configuration of a memory illustrated in FIG. 1.

FIG. 2 is a diagram illustrating the memory 230 of FIG. 1.

Referring to FIG. 2, the memory 230 in accordance with the present embodiment may include a first region R1 in which a flash translation layer (FTL) is stored and a second region R2 which is used as a command queue CMDQ for queuing a command corresponding to a request provided from the host device 20. However, it will be obvious to those skilled in the art that the memory 230 may include regions for various uses, such as a region used as a write data buffer for temporarily storing write data, a region used as a read data buffer for temporarily storing read data, and a region used as a map cache buffer for caching map data, in addition to the regions illustrated in FIG. 2.

The memory 230 may include a region (not illustrated) in which system data, metadata or the like is stored.

When the nonvolatile memory device 100 is configured as a flash memory device, the processor 220 may control a unique operation of the nonvolatile memory device 100, and drive software referred to as the FTL in order to provide device compatibility to the host device 20. As the FTL is driven, the host device 20 may recognize and use the data storage device 10 as a general storage device such as a hard disk.

The FTL stored in the first region R1 of the memory 230 may include modules for performing various functions and metadata required for driving the respective modules. The FTL may be stored in a system region (not illustrated) of the nonvolatile memory device 100. When the data storage device 10 is powered on, the FTL may be read from the system region of the nonvolatile memory device 100, and loaded to the first region R1 of the memory 230.

Figure 3:
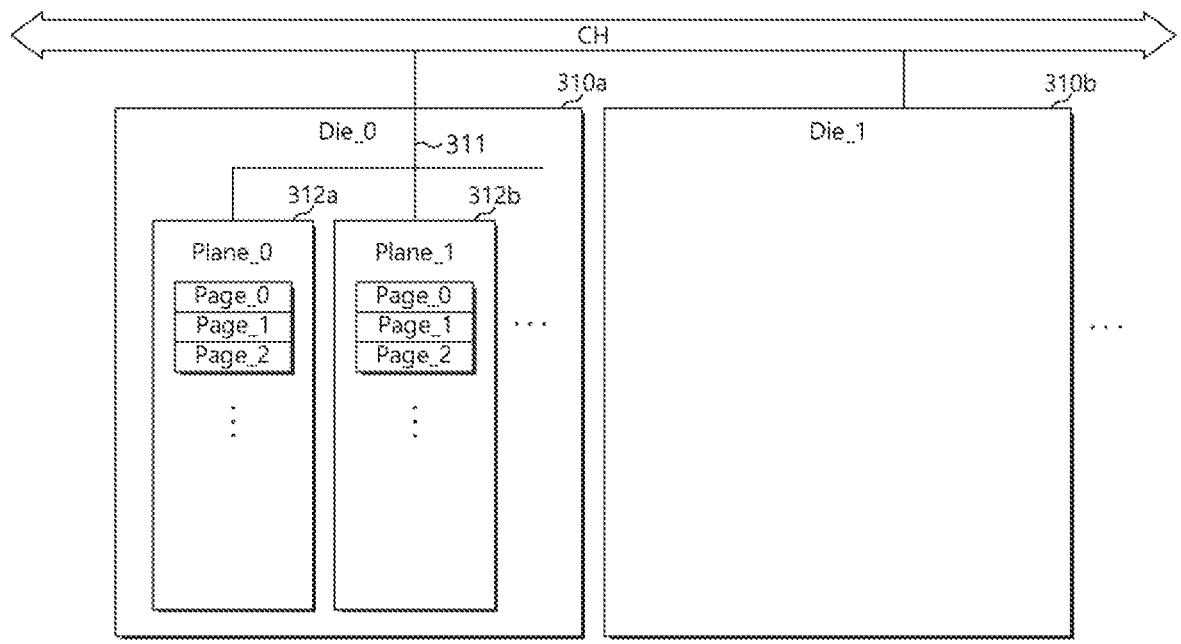
FIG. 3 is a diagram for describing a data storage region included in a nonvolatile memory device in accordance with an embodiment.

FIG. 3 is a diagram for describing a data storage region included in the nonvolatile memory device in accordance with an embodiment.

Referring to FIG. 3, the nonvolatile memory device 100 may include a plurality of dies 310a and 310b which share a channel coupled to the controller 200, each of the dies may include a plurality of planes 312a and 312b which share a way 311 coupled to the channel, and each of the planes may include a plurality of pages. The page may indicate the minimum unit of storage region from or to which data is read or written. Furthermore, a plurality of pages which are collectively erased may be referred to as a memory block, and a plurality of memory blocks which are managed as one memory block may be referred to as a super block. Therefore, a data storage region in the nonvolatile memory device 100 may indicate a die, a plane, a super block, a memory block, a page or the like. In the following descriptions, however, the data storage region may indicate a page unless otherwise referred.

Figure 4:
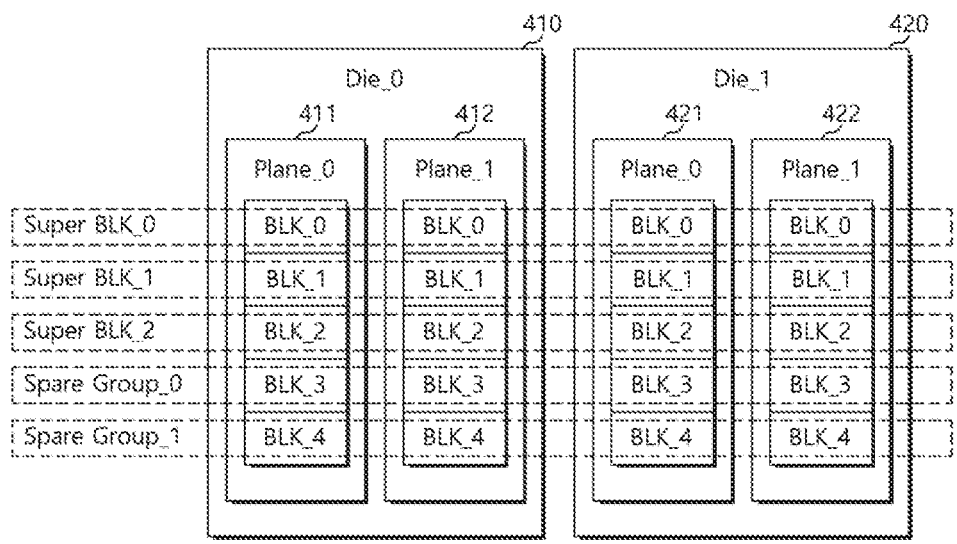
FIG. 4 is a diagram for describing an example of a nonvolatile memory device illustrated in FIG. 1.

FIG. 4 is a diagram for describing an example of the memory device illustrated in FIG. 1.

Referring to FIG. 4, the nonvolatile memory device 100 may include a first die Die_0 410 and a second die Die_1 420. The first die 410 may include two planes 411 and 412, and the second die 420 may include two planes 421 and 422. Each of the planes may include five memory blocks BLK_0 to BLK_4. A super block 0 Super BLK_0 may indicate a memory block group including zeroth memory blocks of the respective planes, a super block 1 Super BLK_1 may indicate a memory block group including first memory blocks of the respective planes, and a super block 2 Super BLK_2 may indicate a memory block group including second memory blocks of the respective planes. Furthermore, the nonvolatile memory device may include a memory block group for replacing a bad block indicating a memory block in which a fail occurs during a write operation for storing data. A spare memory block group 0 Spare Group_0 may indicate a memory block group including third memory blocks of the respective planes, and a spare memory block group 1 Spare Group_1 may indicate a memory block group including fourth memory blocks of the respective planes.

In an embodiment, the spare memory block group 1 may be used to replace a bad block, only when the spare memory block group 0 has no spare block as an available memory block.

Figure 5:
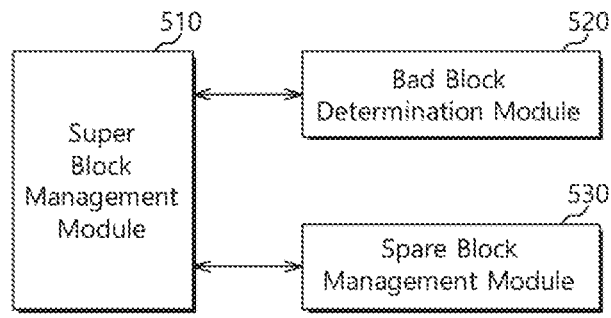
FIG. 5 is a block diagram of an FTL illustrated in FIG. 2 in accordance with an embodiment.

FIG. 5 is a block diagram of the FTL illustrated in FIG. 2 in accordance with the present embodiment.

Referring to FIG. 5, the FTL in accordance with the present embodiment may include a super block management module 510, a bad block determination module 520 and a spare block management module 530.

The super block management module 510 may generate and manage a super block by mapping a plurality of memory blocks included in the nonvolatile memory device 100.

In an embodiment, the super block management module 510 may generate a super block by mapping two or more memory blocks such that way-interleaving is possible. For example, the super block management module 510 may generate a super block to include two or more memory blocks which are included in different planes, respectively.

The super block management module 510 may regenerate a super block by replacing a bad block included in the super block with another memory block included in a spare memory block group. For specific example, when some of the memory blocks included in the super block are determined as bad blocks, the super block management module 510 may regenerate a super block by replacing the memory blocks determined as bad blocks with spare blocks which are memory blocks included in a spare memory block group.

In an embodiment, only when the spare memory block group 0 has no spare block as an available memory block, the super block management module 510 may regenerate a super block by replacing a bad block with a spare block included in the spare memory block group 1.

In an embodiment, the super block management module 510 may preferentially apply a way-interleavable spare block, and regenerate a super block by replacing a bad block with the spare block. In this disclosure, a "way-interleavable" spare block is defined as a spare block that allows, when replacing the bad block within a super block, the nonvolatile memory device 100 to perform a way-interleaving operation to the super block. In this disclosure, a "way-interleavable" memory block is defined as each and every memory block within a super block that allows the nonvolatile memory device 100 to perform a way-interleaving operation to the super block. Specifically, when there is a way-interleavable spare block, the super block management module 510 may regenerate the super block by replacing the bad block with the way-interleavable spare block. Furthermore, when there is no way-interleavable spare block, the super block management module 510 may replace the bad block with a channel-interleavable spare block. In this disclosure, a "channel-interleavable" spare block is defined as a spare block that allows, when replacing the bad block within a super block, the nonvolatile memory device 100 to perform a channel-interleaving operation to the super block.

The super block management module 510 may regenerate a super block by replacing a non-way-interleavable memory block with a way-interleavable memory block. Here, the non-way-interleavable memory block may be a memory block which is unable to perform the way-interleaving operation. Specifically, when some of the memory blocks included in the super block are included in the same plane and thus cannot be way-interleaved, the super block management module 510 may regenerate the super block by replacing the non-way-interleavable memory block with a way-interleavable memory block among available spare blocks included in the spare memory block group.

In an embodiment, when the spare memory block group has no way-interleavable spare block, the super block management module 510 may not regenerate a super block but retain the current super block.

In an embodiment, when the super block management module 510 regenerates a super block by replacing a bad block with a non-way-interleavable spare block, a way-interleavable spare block may be a memory block present in the same plane as the bad block.

The bad block determination module 520 may determine whether a memory block is a bad block. Specifically, the bad block determination module 520 may monitor an erase operation, write operation, read operation or the like of a memory block included in a super block, and determine that a memory block in which a fail of the corresponding operation occurs is a bad block.

The spare block management module 530 may manage spare blocks which are memory blocks for replacing bad blocks.

In an embodiment, the spare block management module 530 may limit the use of spare blocks. Specifically, when the spare memory block group 0 has no way-interleavable spare block but has a non-way-interleavable spare block, the spare block management module 530 may restrict the super block management module 510 from replacing a bad block included in the super block with a spare block included in the spare memory block group 1.

In an embodiment, when a non-way-interleavable memory block included in the super block is replaced with a channel-interleavable spare block, the spare block management module 530 may reallocate an existing non-way-interleavable memory block as a spare block.

The FTL may perform the operation of generating a super block as a background operation.

The block diagram illustrated in FIG. 5 is used to describe the firmware of the FTL in terms of functions, and this is only an example of the FTL. Thus, it is obvious that the FTL is not limited thereto, but can be implemented as separate hardware such as a circuit.

Figure 6:
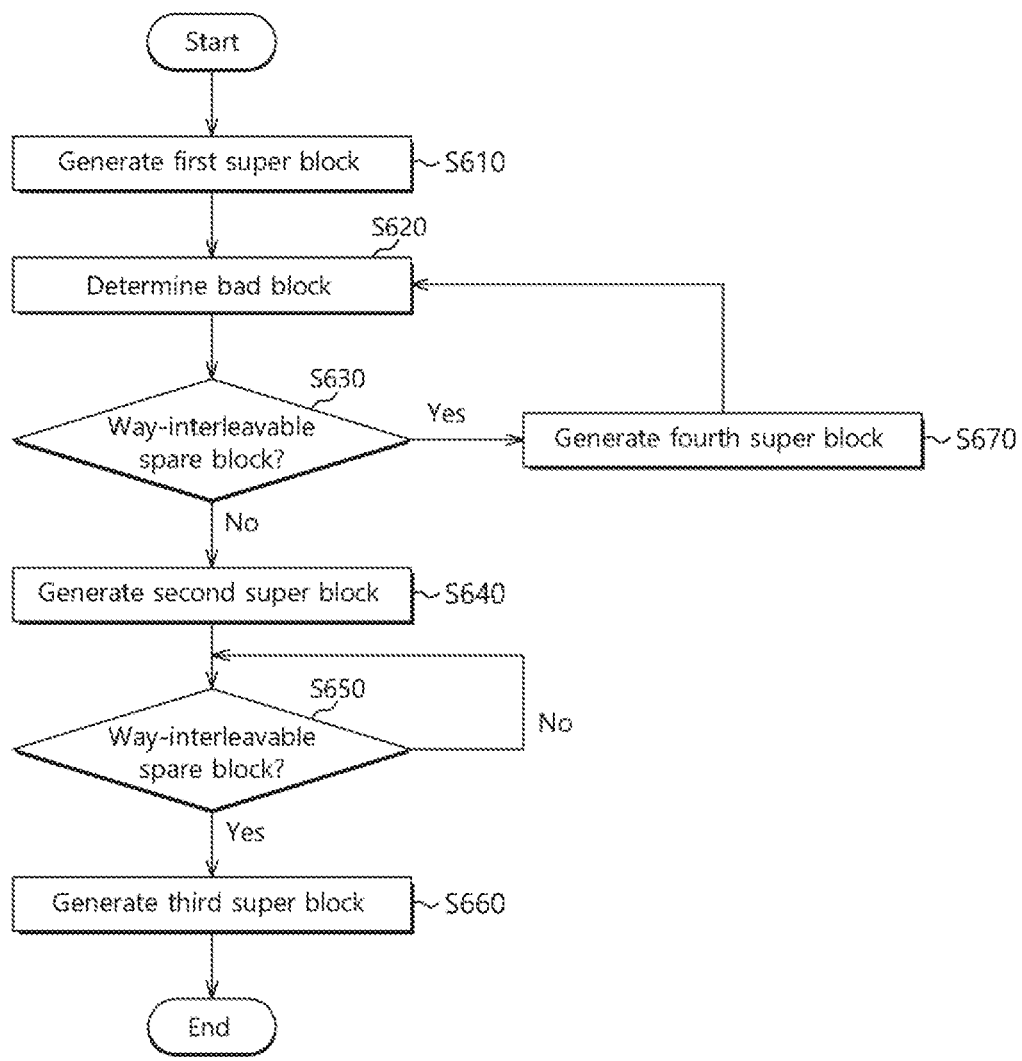
FIG. 6 is a flowchart illustrating an operating method of a data storage device in accordance with an embodiment.
Figure 7:
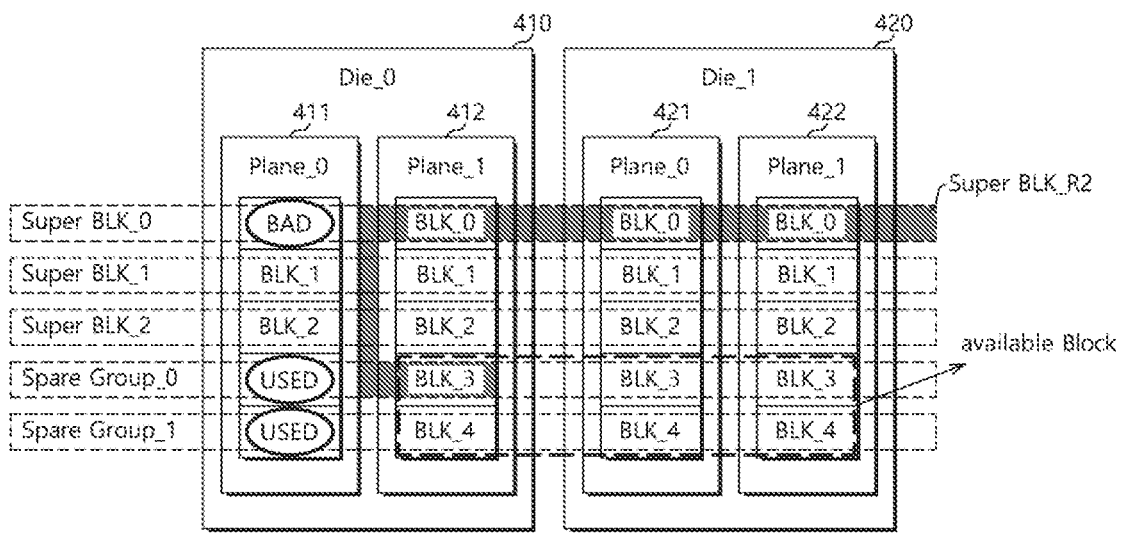
FIGS. 7 to 9 are diagrams for describing spare blocks in accordance with an embodiment.
Figure 8:
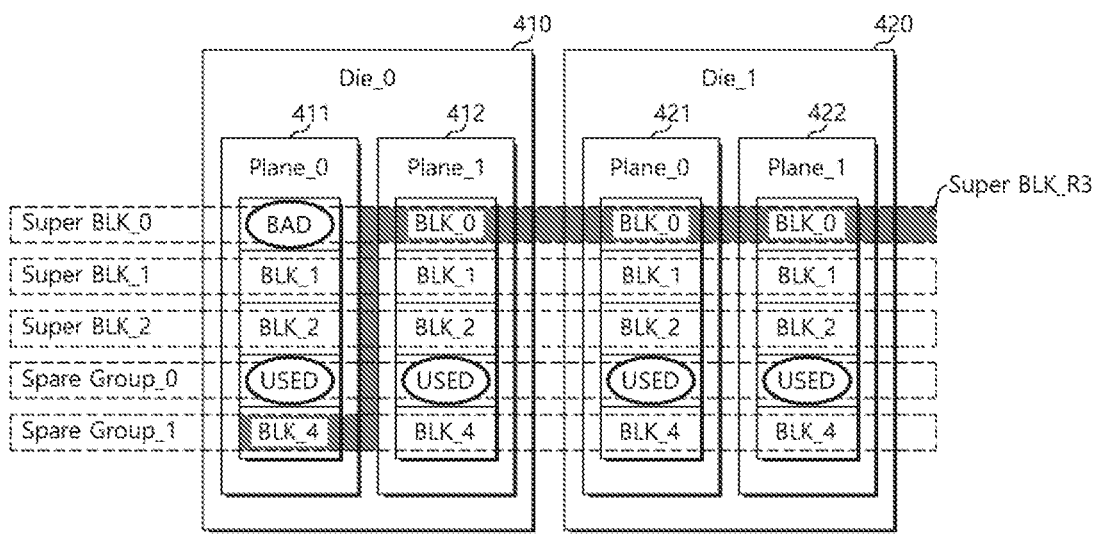
Figure 9:
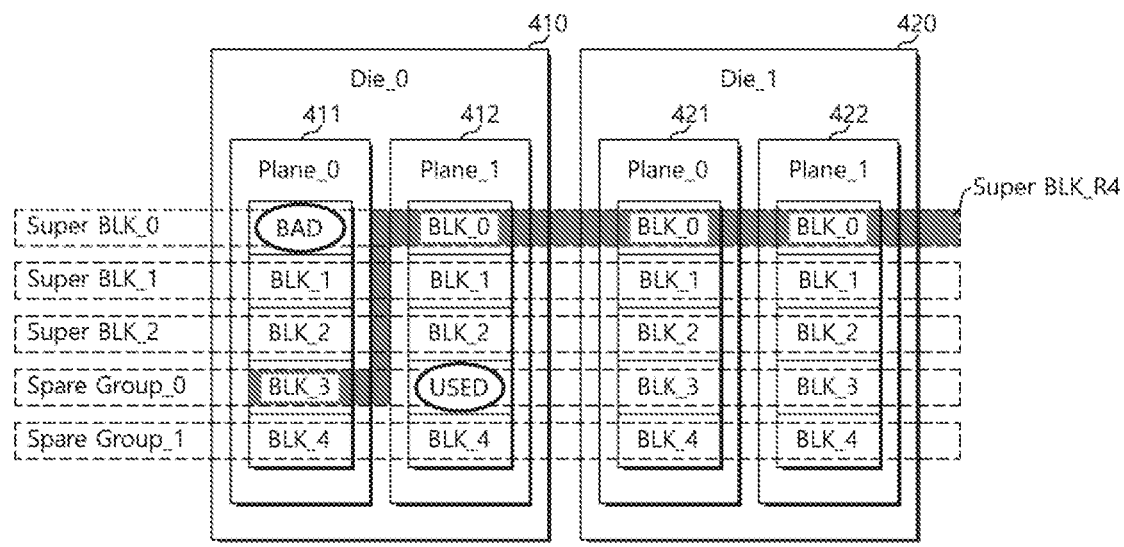

FIG. 6 is a flowchart illustrating an operating method of a data storage device in accordance with an embodiment. FIGS. 7 to 9 are diagrams for describing spare blocks in accordance with an embodiment.

Since it is described that the method is performed by the data storage device 10 illustrated in FIG. 1, it is obvious that the descriptions of the data storage device 10 can be expanded to the method.

Referring to FIG. 6 and FIG. 7, the data storage device 10, for example, the super block management module 510 of the FTL R1 may generate first super blocks Super Block_0, Super Block_1 and Super Block_2 in step S610. Specifically, one of the first super blocks may be one group by mapping two or more memory blocks among the plurality of memory blocks included in the nonvolatile memory device.

In an embodiment, the data storage device 10 may generate the first super block such that way-interleaving is possible. For example, the data storage device 10 may generate the first super block to include two or more memory blocks which are included in different planes, respectively. For example, as illustrated in FIG. 4, the first super blocks Super Block_0, Super Block_1 and Super Block_2 may include four memory blocks included in different planes, respectively.

In step S620, the data storage device 10 may determine a bad block of the first super blocks Super Block_0, Super Block_1 and Super Block_2. Specifically, the data storage device 10 may determine whether the plurality of memory blocks included in the nonvolatile memory device are bad blocks.

In step S630, the data storage device 10 may verify whether there is a way-interleavable spare block. Specifically, when any one of the memory blocks included in the first super blocks is determined as a bad block, the data storage device 10 may retrieve whether there is a spare block as an available memory block for replacing the bad block. Furthermore, the data storage device 10 may verify whether the available spare block is present in the plane including the bad block BAD and the available spare block can be way-interleaved. For example, the data storage device 10 may retrieve available spare blocks for replacing the bad block from the spare memory block groups Spare Group_0 and Spare Group_1 illustrated in FIG. 4, and verify that a block which is present in the same plane as the block determined as the bad block among the retrieved spare blocks is a way-interleavable spare block.

In an embodiment, only when the spare memory block group 0 has no spare block as an available memory block, the data storage device 10 may retrieve the spare blocks of the spare memory block group 1. For example, the data storage device 10 may be set in advance to use the blocks of the spare memory block group 1 Spare Group_1 as spare blocks, after the blocks included in the spare memory block group 0 Spare Group_0 illustrated in FIG. 4 are all used. In this case, the data storage device 10 may retrieve available spare blocks from the spare memory block group 1 Spare Group_1, only when the spare memory block group 0 Spare Group_0 has no available spare block, after the blocks included in the spare memory block group 0 Spare Group 0, illustrated in FIG. 4 are all used.

In an embodiment, the data storage device 10 may verify that spare blocks present in the same plane as the memory block determined as a bad block among the available memory blocks for replacing the bad block are way-interleavable spare blocks. For example, when a block of the plane 0 Plane_0 of the die 0 Die_0 among the blocks constituting the first super block Super Block_0 illustrated in FIG. 4 is determined as the bad block, the data storage device 10 may verify that the blocks BLK_3 and BLK_4 of the blocks included in the plane 0 Plane_0 of the die 0 Die_0 in the spare group 0 Spare Group 0 and the spare group 1 Spare Group 1 are way-interleavable blocks.

In an embodiment, a way-interleavable memory blocks positioned in planes being different from the plane including the bad block among the spare blocks may be determined as non-way-interleavable spare blocks. For example, when a block of the plane 0 Plane_0 of the die 0 Die_0 among the blocks constituting the first super block 0 Super Block_0 illustrated in FIG. 4 is determined as the bad block, the data storage device 10 may verify that the blocks BLK_3 and BLK_4 of the blocks included in the plane 1 Plane_1 of the die 0 Die_0, the plane 0 Plane_0 of the die 1 Die_1 and the plane 1 Plane_1 of the die 1 Die_1 are non-way-interleavable blocks.

In step S640, the data storage device 10 may generate a second replacing super block. Specifically, when there are no way-interleavable spare blocks, the data storage device 10 may generate the second replacing super block as a super block in which the bad block is replaced with a non-way-interleavable spare block. For example, as illustrated in FIG. 7, the block BLK_0 included in the plane 0 Plane_0 of the die 0 Die_0 among the blocks constituting the super block Super Block_0 serving as the first super block was determined as a bad block, but the spare blocks included in the plane Plane_0 among the spare blocks constituting the spare memory block group 0 Spare Group_0 and the spare blocks constituting the spare memory block group 1 Spare Group_1 may not be available (there is no way-interleavable spare block). In this case, the data storage device 10 may replace the bad block of the super block 0 serving as the first super block with any one of the available blocks. Thus, the data storage device 10 may generate the second replacing super block Super BLK_R2 as the super block 0 in which the bad block of the super block 0 having served as the first super block has been replaced with a non-way-interleavable spare block. For example, when a first memory block BLK 0 of the first plane 411 in the first die Die_0 is a bad memory block BAD and the first plane 411 does not have an available memory block, the first block BLK 0 of the first plane 411 in the first die Die_0 may be replaced with one of the non-way-interleavable memory blocks BLKs 3 and BLKs 4 in the spare block groups Spare Groups 0 and 1. For example, the second replacing super block Super BLK_R2 to the first super block Super BLK 0 is shown in FIG. 7.

In step S650, the data storage device 10 may verify whether there are way-interleavable spare blocks in the plane 411 including the bad block BAD. Specifically, the data storage device 10 may retrieve whether there are spare blocks which can replace non-way-interleavable memory blocks of the second replacing super block Super BLK_R2, after generating the second replacing super block Super BLK_R2. Through a specific process, used blocks of the plane 411 including the bad block can be processed to way-interleavable spare blocks after the second replacing super block Super BLK_R2 is generated. Meanwhile, the data storage device 10 may be set in advance to use the blocks of the spare memory block group 1 Spare Group_1 as spare blocks, after the blocks included in the spare memory block group 0 Spare Group_0 illustrated in FIG. 8 are all used. In this case, based on the situation that only non-way-interleavable blocks were available among the blocks included in the spare memory block group 0 Spare Group_0 at the time that the second replacing super block Super BLK_R2 was generated, the blocks included in the spare memory block group Spare Group_1 may be used as spare blocks, as the blocks included in the spare memory block group 0 Spare Group_0 are all used after the second replacing super block is generated. Then, the data storage device 10 may retrieve whether there are way-interleavable blocks among the available blocks included in the spare memory block group 1 Spare Group_1.

In step S660, the data storage device 10 may generate a third replacing super block Super BLK_R3 as shown in FIG. 8. Specifically, when the available memory blocks include a spare block which can replace a non-way-interleavable memory block such that way-interleaving is possible, the data storage device 10 may generate the third replacing super block as a super block in which a non-way-interleavable spare block is replaced with a way-interleavable spare block. For example, when the blocks included in the spare memory block group 0 Spare Group_0 are all used after the second replacing super block was generated based on the non-way-interleavable block included in the spare memory block group 0 Spare Group_0 as illustrated in FIG. 8, the data storage device 10 may generate the third replacing super block by replacing the non-way-interleavable block of the second replacing super block with a way-interleavable block of the blocks included in the spare memory block group 1 Spare Group_1. In other words, the way-interleavable block BLK 4 has been retrieved in the spare memory block group 1 Spare Group_1 of the plane 0 including the bad block BAD, through the step 650, the non-way interleavable spare block BLK 3 of the second replacing super block Super BLK_R2 is replaced with the retrieved way-interleavable block BLK 4, to form the third replacing super block Super BLK_R3.

In step S670, the data storage device 10 may generate a fourth replacing super block Super BLK_R4. Specifically, when it is determined in step S630 that there is a way-interleavable spare block in the first spare group Spare Group 0 of the plane 411, the data storage device 10 may generate the fourth replacing super block Super BLK_R4 as a super block in which the bad block is replaced with a way-interleavable spare block in the first spare group Spare Group 0 of the plane 411 including the bad block BAD. For example, when the way-interleavable spare block is present as an available spare block in the same plane as the block determined as the bad block as illustrated in FIG. 9, the data storage device 10 may generate the fourth super block by replacing the bad block with the way-interleavable spare block.

Figure 10:
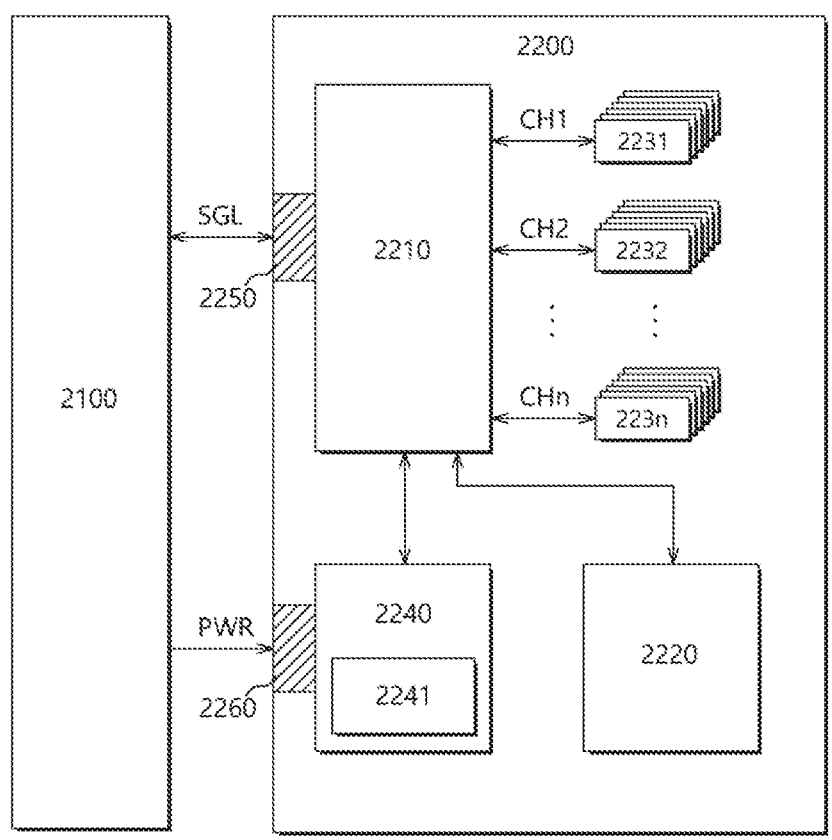
FIG. 10 is a diagram illustrating a data processing system including a solid state drive (SSD) in accordance with an embodiment.

FIG. 10 illustrates a data processing system including a solid state drive (SSD) in accordance with an embodiment. Referring to FIG. 10, the data processing system 2000 may include a host device 2100 and an SSD 2200.

The SSD 2200 may include a controller 2210, a buffer memory device 2220, nonvolatile memory devices 2231 to 223n, a power supply 2240, a signal connector 2250 and a power connector 2260.

The controller 2210 may control overall operations of the SSD 2200.

The buffer memory device 2220 may temporarily store data which are to be stored in the nonvolatile memory devices 2231 to 223n. Furthermore, the buffer memory device 2220 may temporarily store data read from the nonvolatile memory devices 2231 to 223n. The data which are temporarily stored in the buffer memory device 2220 may be transferred to the host device 2100 or the nonvolatile memory devices 2231 to 223n under control of the controller 2210.

The nonvolatile memory devices 2231 to 223n may be used as storage media of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to one channel may be coupled to the same signal bus and data bus.

The power supply 2240 may provide power PWR inputted through the power connector 2260 into the SSD 2200. The power supply 2240 may include an auxiliary power supply 2241. The auxiliary power supply 2241 may supply power to normally turn off the SSD 2200, when a sudden power off occurs. The auxiliary power supply 2241 may include large capacitors capable of storing power PWR.

The controller 2210 may exchange signals SGL with the host device 2100 through the signal connector 2250. The signal SGL may include a command, address, data and the like. The signal connector 2250 may be configured as various types of connectors depending on an interface method between the host device 2100 and the SSD 2200.

Figure 11:
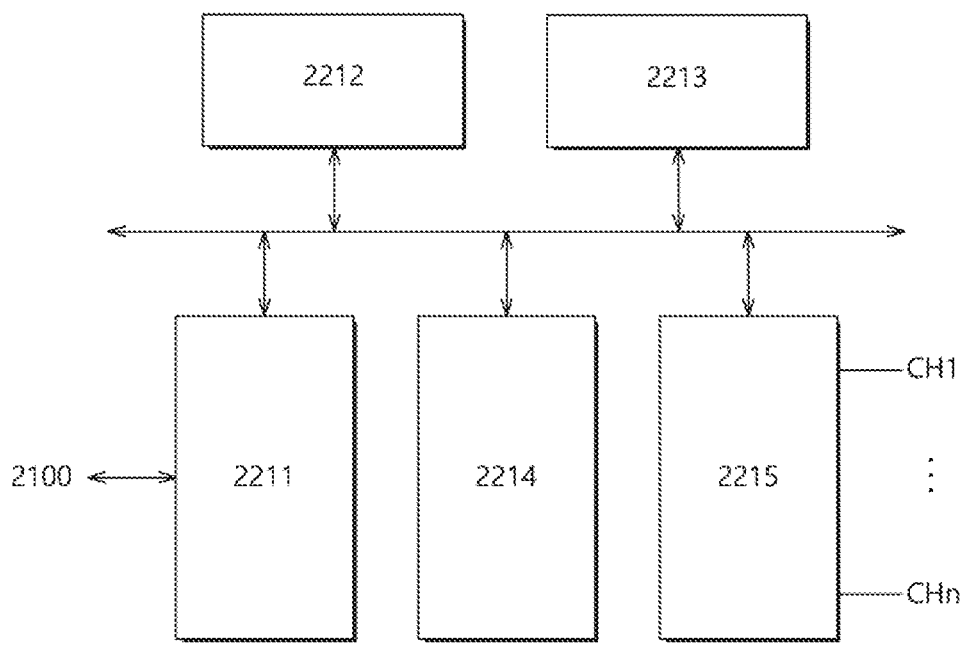
FIG. 11 is a diagram illustrating a configuration of a controller of FIG. 10.

FIG. 11 illustrates a configuration of the controller of FIG. 10. Referring to FIG. 11, the controller 2210 may include a host interface unit 2211, a control unit 2212, a RAM 2213, an ECC unit 2214 and a memory interface unit 2215.

The host interface unit 2211 may interface the host device 2100 and the SSD 2200 according to a protocol of the host device 2100. For example, the host interface unit 2211 may communicate with the host device 2100 through any one protocol of secure digital, USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express) and UFS (Universal Flash Storage). The host interface unit 2211 may perform a disk emulation function which supports the host device 2100 to recognize the SSD 2200 as a universal data storage device, for example, a hard disk drive (HDD).

The control unit 2212 may analyze and process the signal SGL inputted from the host device 2100. The control unit 2212 may control operations of internal function blocks according to firmware or software for driving the SSD 2200. The RAM 2213 may be used as a working memory for driving such firmware or software.

The ECC unit 2214 may generate parity data of the data which are to be transferred to the nonvolatile memory devices 2231 to 223n. The generated parity data and the data may be stored in the nonvolatile memory devices 2231 to 223n. The ECC unit 2214 may detect an error of data read from the nonvolatile memory devices 2231 to 223n based on the parity data. When the detected error falls within a correctable range, the ECC unit 2214 may correct the detected error.

The memory interface unit 2215 may provide a control signal such as a command and address to the nonvolatile memory devices 2231 to 223n, under control of the control unit 2212. The memory interface unit 2215 may exchange data with the nonvolatile memory devices 2231 to 223n, under control of the control unit 2212. For example, the memory interface unit 2215 may provide data stored in the buffer memory device 2220 to the nonvolatile memory devices 2231 to 223n, or provide data read from the nonvolatile memory devices 2231 to 223n to the buffer memory device 2220.

Figure 12:
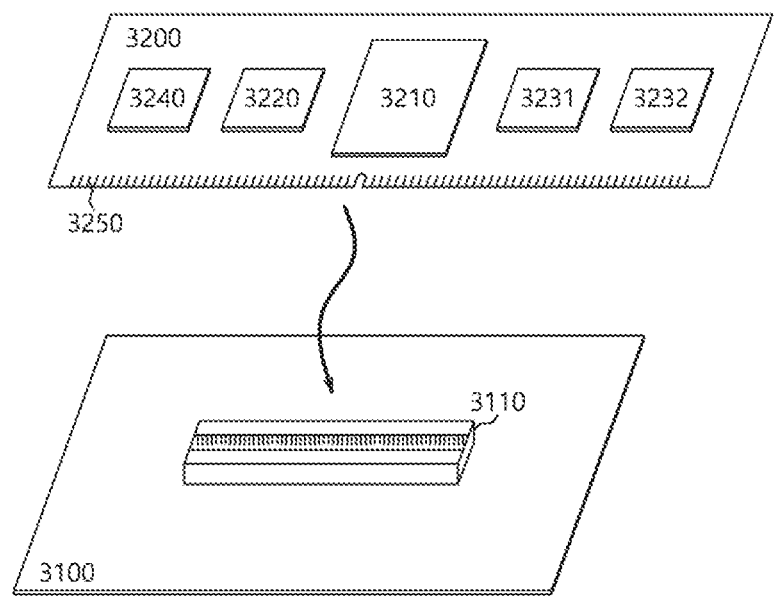
FIG. 12 is a diagram illustrating a data processing system including a data storage device in accordance with an embodiment.

FIG. 12 illustrates a data processing system including a data storage device in accordance with an embodiment. Referring to FIG. 12, the data processing system 3000 may include a host device 3100 and a data storage device 3200.

The host device 3100 may be configured as a board such as a PCB. Although not illustrated, the host device 3100 may include internal function blocks for performing a function of the host device.

The host device 3100 may include a connection terminal 3110 such as a socket, slot or connector. The data storage device 3200 may be mounted on the connection terminal 3110.

The data storage device 3200 may be configured as a board such as a PCB. The data storage device 3200 may be referred to as a memory module or memory card. The data storage device 3200 may include a controller 3210, a buffer memory device 3220, nonvolatile memory devices 3231 and 3232, a power management integrated circuit (PMIC) 3240 and a connection terminal 3250.

The controller 3210 may control overall operations of the data storage device 3200. The controller 3210 may be configured in the same manner as the controller 2210 illustrated in FIG. 11.

The buffer memory device 3220 may temporarily store data which are to be stored in the nonvolatile memory devices 3231 and 3232. Furthermore, the buffer memory device 3220 may temporarily store data read from the nonvolatile memory devices 3231 and 3232. The data which are temporarily stored in the buffer memory device 3220 may be transferred to the host device 3100 or the nonvolatile memory devices 3231 and 3232 under control of the controller 3210.

The nonvolatile memory devices 3231 to 3232 may be used as storage media of the data storage device 3200.

The PMIC 3240 may provide power inputted through the connection terminal 3250 into the data storage device 3200. The PMIC 3240 may manage the power of the data storage device 3200 under control of the controller 3210.

The connection terminal 3250 may be coupled to the connection terminal 3110 of the host device. Through the connection terminal 3250, signals and power may be transferred between the host device 3100 and the data storage device 3200, the signals including a command, address, data and the like. The connection terminal 3250 may be configured in various manners depending on an interface method between the host device 3100 and the data storage device 3200. The connection terminal 3250 may be disposed at any one side of the data storage device 3200.

Figure 13:
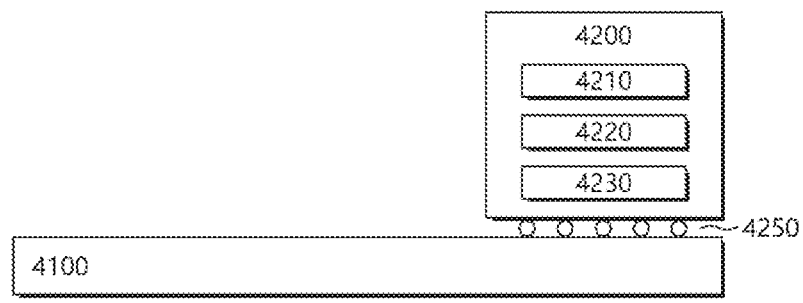
FIG. 13 is a diagram illustrating a data processing system including a data storage device in accordance with an embodiment.

FIG. 13 illustrates a data processing system including a data storage device in accordance with an embodiment. Referring to FIG. 13, the data processing system 4000 may include a host device 4100 and a data storage device 4200.

The host device 4100 may be configured as a board such as a PCB. Although not illustrated, the host device 4100 may include internal function blocks for performing a function of the host device.

The data storage device 4200 may be configured as a surface mount package. The data storage device 4200 may be mounted on the host device 4100 through solder balls 4250. The data storage device 4200 may include a controller 4210, a buffer memory device 4220 and a nonvolatile memory device 4230.

The controller 4210 may control overall operations of the data storage device 4200. The controller 4210 may be configured in the same manner as the controller 2210 illustrated in FIG. 11.

The buffer memory device 4220 may temporarily store data which are to be stored in the nonvolatile memory device 4230. Furthermore, the buffer memory device 4220 may temporarily store data read from the nonvolatile memory device 4230. The data which are temporarily stored in the buffer memory device 4220 may be transferred to the host device 4100 or the nonvolatile memory device 4230 under control of the controller 4210.

The nonvolatile memory device 4230 may be used as a storage medium of the data storage device 4200.

Figure 14:
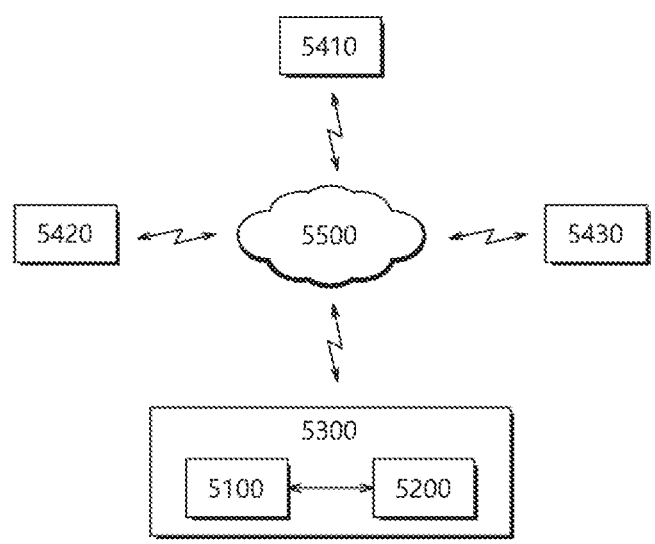
FIG. 14 is a diagram illustrating a network system including a data storage device in accordance with an embodiment.

FIG. 14 illustrates a network system 5000 including a data storage device in accordance with an embodiment of the present invention. Referring to FIG. 14, the network system 5000 may include a server system 5300 and a plurality of client systems 5410, 5420 and 5430 which are connected through a network 5500.

The server system 5300 may provide data in response to requests of the plurality of client systems 5410, 5420 and 5430. For example, the server system 5300 may store data provided from the plurality of client systems 5410, 5420 and 5430. For another example, the server system 5300 may provide data to the plurality of client systems 5410, 5420 and 5430.

The server system 5300 may include a host device 5100 and a data storage device 5200. The data storage device 5200 may be configured as the data storage device 10 of FIG. 1, the data storage device 2200 of FIG. 11, the data storage device 3200 of FIG. 12 or the data storage device 4200 of FIG. 13.

Figure 15:
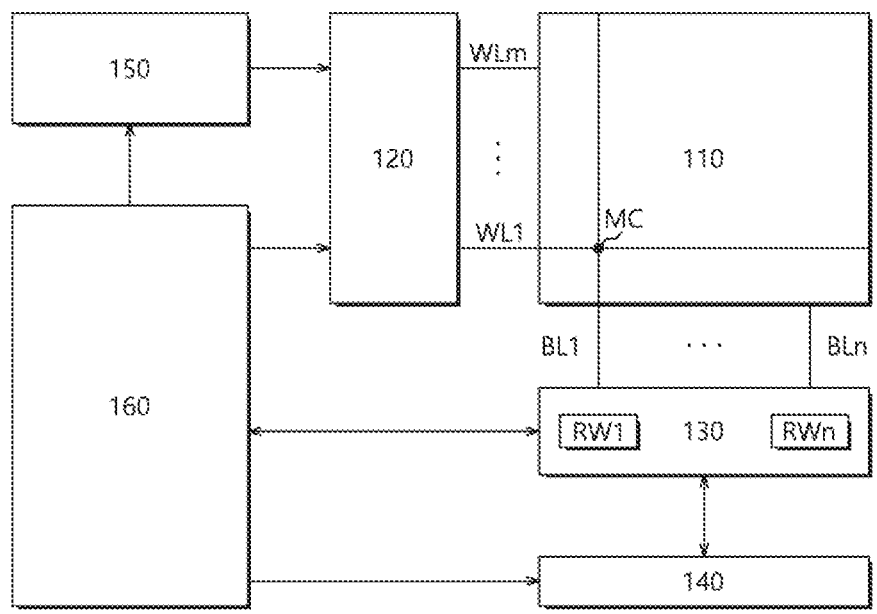
FIG. 15 is a block diagram illustrating a nonvolatile memory device included in a data storage device in accordance with an embodiment.

FIG. 15 is a block diagram illustrating a nonvolatile memory device included in a data storage device in accordance with an embodiment. Referring to FIG. 15, the nonvolatile memory device 100 may include a memory cell array 110, a row decoder 120, a column decoder 130, a data read/write block 140, a voltage generator 150 and a control logic 160.

The memory cell array 110 may include memory cells MC arranged at the respective intersections between word lines WL1 to WLm and bit lines BL1 to BLn.

The row decoder 120 may be coupled to the memory cell array 110 through the word lines WL1 to WLm. The row decoder 120 may operate under control of the control logic 160. The row decoder 120 may decode an address provided from an external device (not illustrated). The row decoder 120 may select and drive the word lines WL1 to WLm based on the decoding result. For example, the row decoder 120 may provide word line voltages provided from the voltage generator 150 to the word lines WL1 to WLm.

The data read/write block 140 may be coupled to the memory cell array 110 through the bit line BL1 to BLn. The data read/write block 140 may include read/write circuits RW1 to RWn corresponding to the respective bit line BL1 to BLn. The data read/write block 140 may operate under control of the control logic 160. The data read/write block 140 may operate as a write driver or sense amplifier depending on operation modes. For example, the data read/write block 140 may operate as a write driver which stores data provided from the external device in the memory cell array 110, during a write operation. For another example, the data read/write block 140 may operate as a sense amplifier which reads data from the memory cell array 110, during a read operation.

The column decoder 130 may operate under control of the control logic 160. The column decoder 130 may decode an address provided from the external device. The column decoder 130 may couple the read/write circuits RW1 to RWn of the data read/write block 140, corresponding to the respective bit lines BL1 to BLn, to a data input/output line (or data input/output buffer) according to the decoding result.

The voltage generator 150 may generate a voltage which is used for an internal operation of the nonvolatile memory device 100. The voltages generated by the voltage generator 150 may be applied to the memory cells of the memory cell array 110. For example, a program voltage generated during a program operation may be applied to a word line of memory cells on which the program operation is to be performed. For another example, an erase voltage generated during an erase operation may be applied to well regions of memory cells on which the erase operation is to be performed. For another example, a read voltage generated during a read operation may be applied to a word line of memory cells on which the read operation is to be performed.

The control logic 160 may control overall operations of the nonvolatile memory device 100 based on a control signal provided from the external device. For example, the control logic 160 may control an operation of the nonvolatile memory device 100, such as a read, write or erase operation of the nonvolatile memory device 100.

In accordance with the present embodiment, it is possible to improve the performance of the data storage device through way-interleaving.

While various embodiments have been described above, it will be understood to those skilled in the art that the embodiments described are examples only. Accordingly, the data storage device and the operating method which are described herein should not be limited based on the described embodiments.

What is claimed is:

1. A data storage device comprising:
   a memory device including a plurality of planes, wherein each of the planes includes a plurality of memory blocks; and
   a controller configured to control an operation of the memory device, wherein the controller is further configured to:
generate a first super block including way-interleavable memory blocks among the plurality of memory blocks included in the plurality of planes;
determine whether there is a bad block among the way-interleavable memory blocks in the first super block;
determine whether there are available spare blocks in a plane where the bad block is located, when there is the bad block in the first super block;
generate a second super block by replacing the bad block with a first spare block included in one of planes other than the plane, when there are no the available spare blocks in the plane, and
generate a third super block by re-replacing the first spare block in the second super block with a second spare block in the plane, when one of spare blocks in the plane becomes available.

2. The data storage device according to claim 1, wherein the controller is configured to generate the first super block based on two or more memory blocks which are included in different planes, respectively.

3. The data storage device according to claim 1, wherein the memory device comprises a first spare memory block group and a second spare memory block group, each of which includes two or more spare blocks included in the memory device.

4. The data storage device according to claim 3, wherein, when all spare blocks of the first spare memory block group are used, spare blocks included in the second spare memory block group become available.

5. The data storage device according to claim 1, wherein spare blocks in the planes other than the plane where the bad block is located are non-way-interleavable spare blocks, and
wherein the spare blocks in the plane where the bad block is located are way-interleavable spare blocks.

6. The data storage device according to claim 5, wherein the way-interleavable spare blocks are included in the same plane as the bad block, and
wherein the non-way-interleavable spare blocks are included in different planes from the bad block.

7. The data storage device according to claim 3, wherein the controller retrieves, when the first spare block in the second super block is included in the first spare memory block group and no available spare blocks are present in the first spare memory block group after the second super block is generated, a spare block included in the same plane as the bad block among the spare blocks included in the second spare memory block group.

8. An operating method of a data storage device which includes a memory device including a plurality of memory blocks and a controller configured to control an operation of the memory device, the operating method comprising:
generating a first super block including way-interleavable memory blocks among the plurality of memory blocks;
determining that there is a bad block among the way-interleavable memory blocks of the first super block;
determining whether there are available spare blocks in a plane where the bad block is located, when there is the bad block in the first super block;
generating a second super block by replacing the bad block with a first spare block included in one of planes other than the plane, when there are no the available spare blocks in the plane; and
generating a third super block by re-replacing the first spare block in the second super block with a second spare block in the plane, when one of spare blocks in the plane is available.

9. The operating method according to claim 8,
wherein the memory device comprises a plurality of planes each including one or more memory blocks,
wherein the generating of the first super block comprises generating the first super block based on two or more memory blocks included in different planes, respectively.

10. The operating method according to claim 8, wherein the determining that there is the bad block comprises determining that a memory block in which a write operation fail occurs, among memory blocks included in the first super block, is the bad block.

11. The operating method according to claim 8,
wherein the memory device comprises a first spare memory block group and a second spare memory block group, each of which includes two or more spare blocks included in the memory device, and
wherein the first spare memory block group and the second spare memory block group sequentially become available.

12. The operating method according to claim 11, wherein one of the spare blocks included in the second spare memory block group is available, when all spare blocks included in the first spare memory block group are used.

13. The operating method according to claim 8, wherein the second spare block is a way-interleavable spare block included in the same plane as the bad block.

14. The operating method according to claim 8,
wherein the memory device comprises a first spare memory block group and a second spare memory block group, each of which includes two or more spare blocks included in the memory device, and
wherein the second spare block is retrieved in the same plane as the bad block among the spare blocks included in the second spare memory block group, when the first spare block is included in the first spare memory block group and no available spare block is present in the first spare memory block group after the second super block is generated.

15. The operating method according to claim 8, wherein one or more of the steps are performed as a background operation.

16. A data storage device comprising:
a memory device including a plurality of planes, wherein each of the planes includes a plurality of memory blocks; and
a controller configured to control an operation of the memory device,
wherein the controller is configured to:
manage super blocks, each including way-interleavable memory blocks among the plurality of memory blocks;
determine whether there is a bad block among the way-interleavable memory blocks included in each of the super blocks; and
manage one or more spare super blocks, each having way-interleavable memory spare block to be replaced with the bad block based on the bad block determination,
wherein, when there is no way-interleavable memory spare block in a first spare super block currently available among the one or more spare super blocks, the bad block is replaced with a non-way-interleavable memory spare block included in the first spare super block, and
wherein, when a second spare super block among the one or more spare super blocks becomes available, the replaced non-way-interleavable memory spare block is re-replaced with a way-interleavable memory spare block included in the second spare super block.

17. A method of operating a data storage device which includes a memory device including a plurality of planes, each having a plurality of memory blocks and a controller configured to control an operation of the memory device, the operating method comprising:
    managing super blocks, by the controller, each including way-interleavable memory blocks among the plurality of memory blocks;
    determining whether there is a bad block among the way-interleavable memory blocks included in each of the super blocks, by the controller;
    manage one or more spare super blocks, by the controller, each having a way-interleavable memory spare block to be replaced with the bad block based on the bad block determination;
    generating, when there is no way-interleavable memory spare block to be replaced with the bad block in a first spare super block currently available among the one or more spare super blocks, a first new super block in which the bad block was replaced with a non-way-interleavable memory spare block included in the first spare super block; and
    generating, when a second spare super block becomes available among the one or more spare super blocks, a second new super block in which the replaced non-way-interleavable memory block of the first new super block was again replaced with a way-interleavable memory spare block included in the second spare super block.

18. A data storage device comprising:
    a memory device including a plurality of planes, wherein each of the planes includes a plurality of memory blocks; and
    a controller configured to control an operation of the memory device,
    wherein the controller includes:
    a super block manager configured to manage super blocks, each including two or more way-interleavable memory blocks among the plurality of memory blocks;
    a bad block determinator configured to determine whether there is a bad block among the two or more way-interleavable memory blocks included in each of the super blocks; and
    a spare block manager configured to manage one or more spare super blocks, each having a way-interleavable memory spare block to be replaced with the bad block based on the bad block determination,
    wherein, when there is no way-interleavable memory spare block to be replaced with the bad block in a first spare super block currently available among the one or more spare super blocks, the super block manager generates a first new super block by replacing the bad block with a non-way-interleavable memory spare block included in the first spare super block, and
    wherein, when a second spare super block among the one or more spare super blocks becomes available, the super block manager generates a second new super block by re-replacing the replaced non-way-interleavable memory block of the first new super block with a way-interleavable memory spare block included in the second spare super block.

* * * * *